March 23, 1937. G. M. HOLLEY ET AL 2,074,471
THERMOSTATIC CONTROL OF AUTOMOBILE ENGINE FUEL
Original Filed June 9, 1932 3 Sheets-Sheet 1
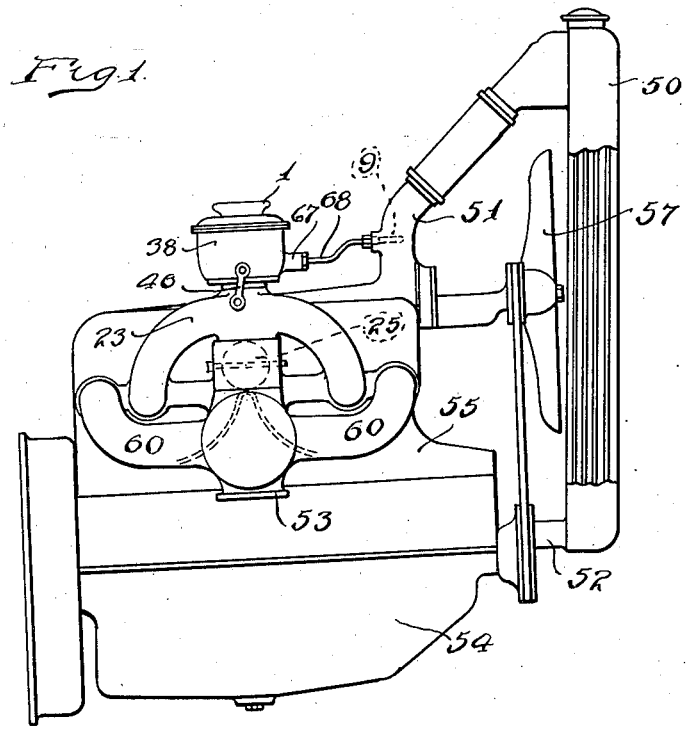
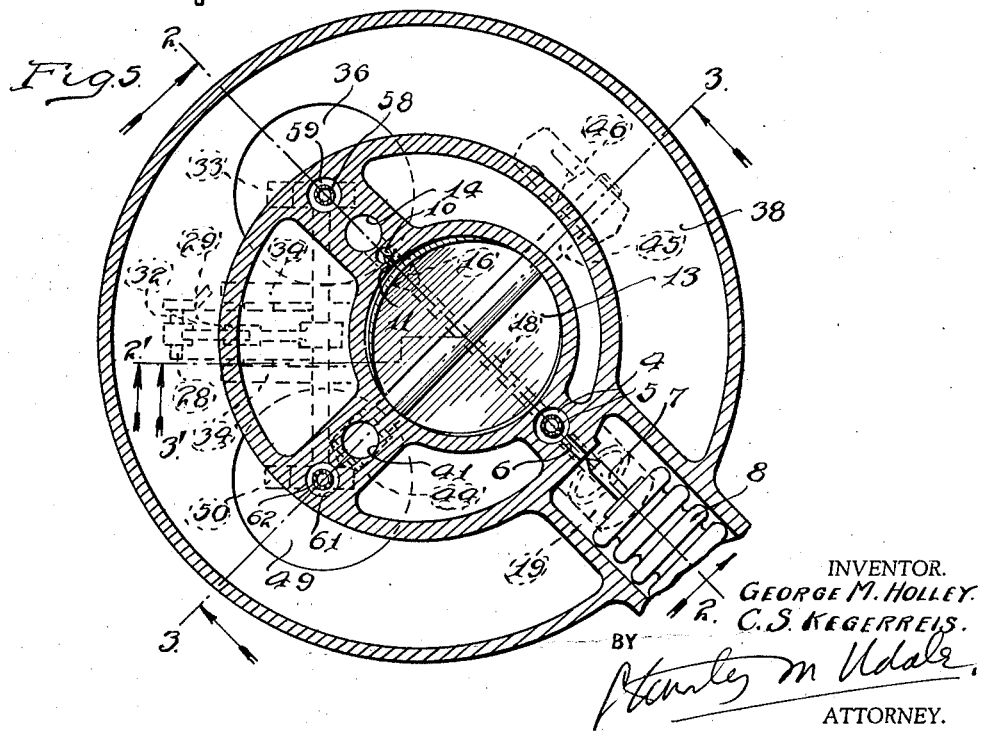
INVENTOR.
GEORGE M. HOLLEY.
C. S. KEGERREIS.
BY
ATTORNEY.

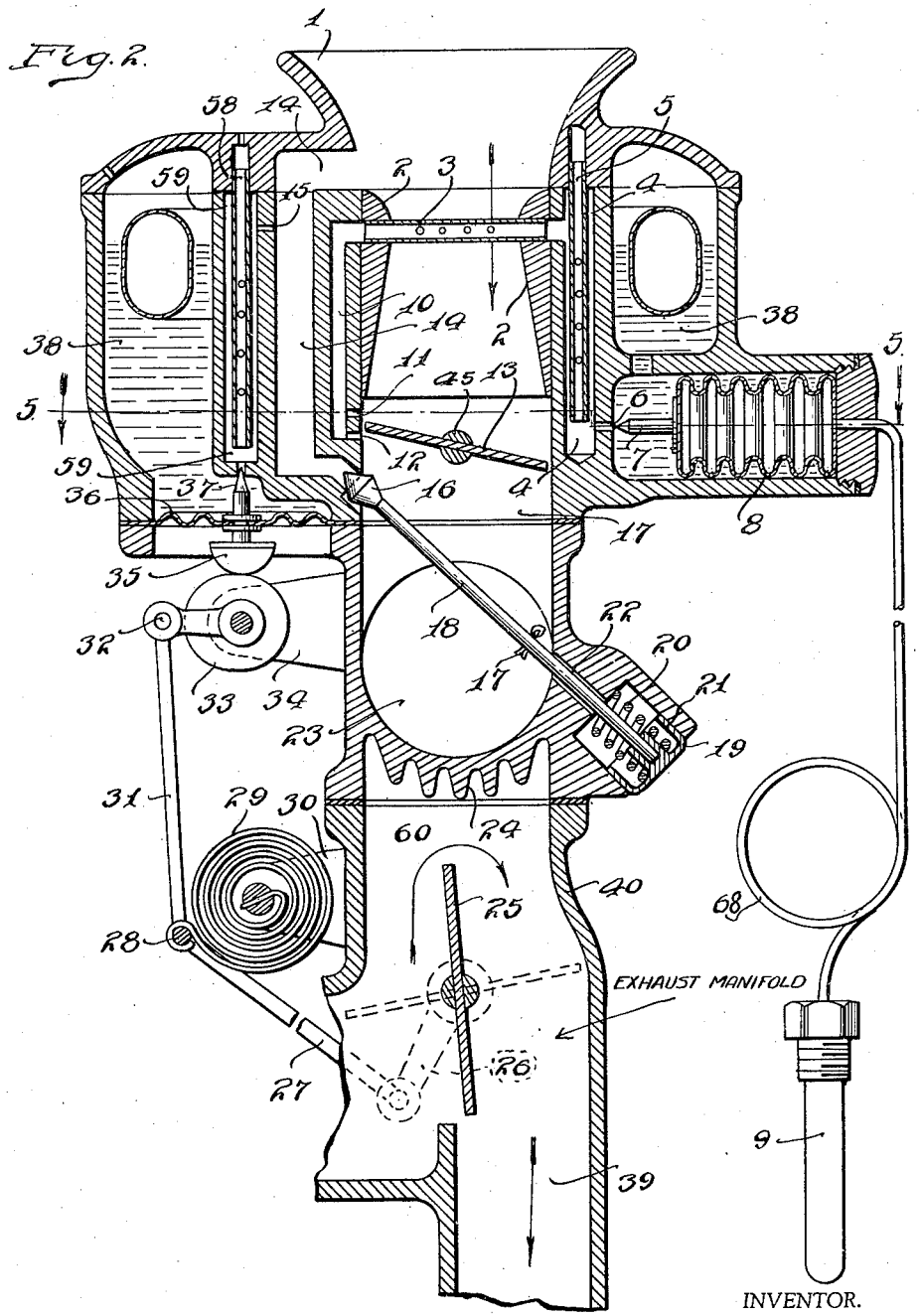

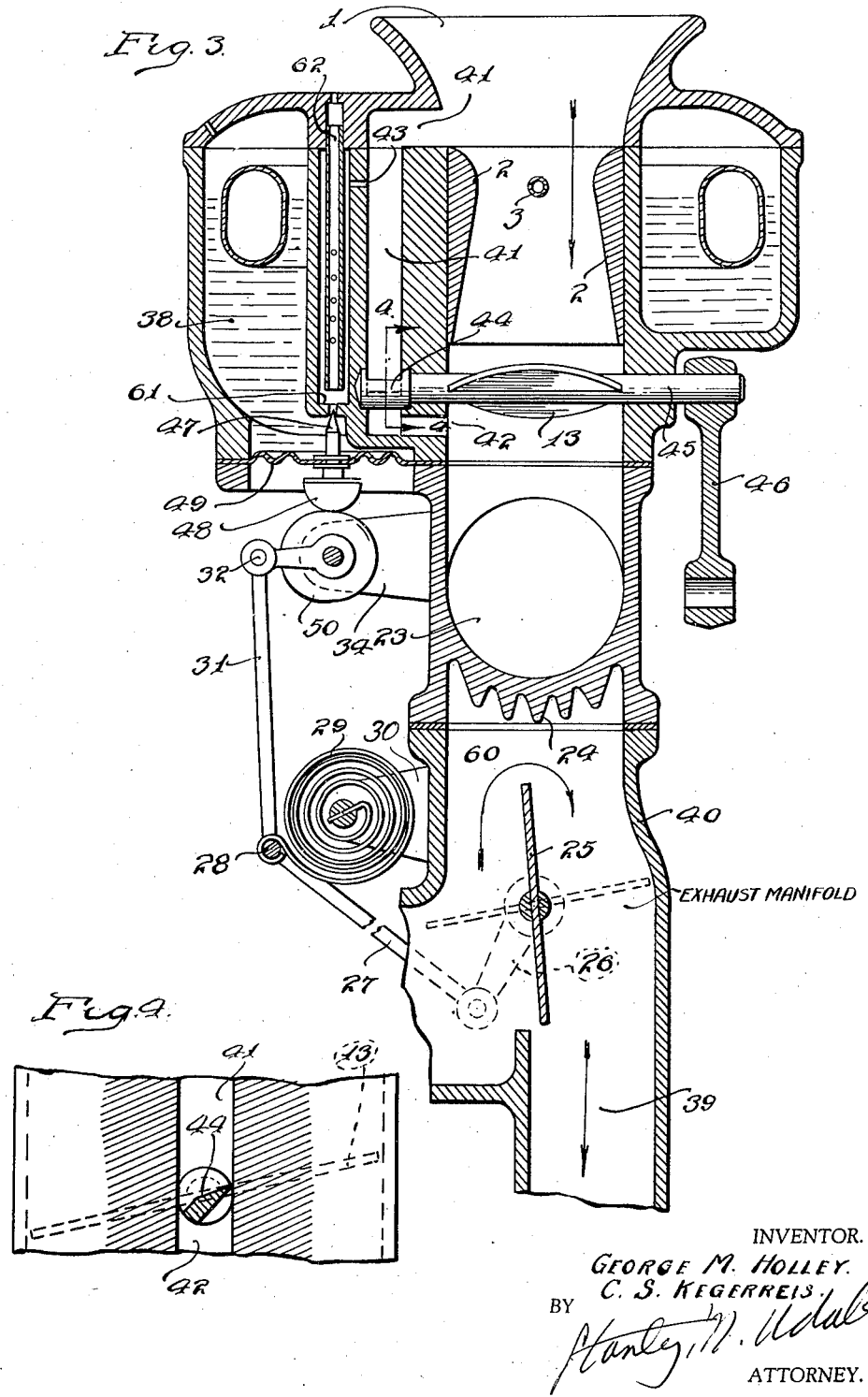

Patented Mar. 23, 1937

2,074,471

UNITED STATES PATENT OFFICE 2,074,471

THERMOSTATIC CONTROL OF AUTOMOBILE ENGINE FUEL

George M. Holley and Claude S. Kegerreis, Detroit, Mich., assignors to Geo. M. and Earl Holley Engineering, Detroit, Mich.

Application June 9, 1932, Serial No. 616,278
Renewed September 18, 1935

7 Claims. (Cl. 123—119)

The object of this invention is to provide thermostatic means for—

(a) Priming the engine on starting.
(b) Providing the extra fuel required after starting during the warming up period.
(c) Economizing fuel when the water jacket temperature rises to normal.

The problem is to avoid flooding the engine in hot weather and yet to always have sufficient fuel so that the engine can be started and driven without any manual adjustment of either the choke valve or of the needle valve which controls the fuel.

Description

Figure 1 shows the device in elevation applied to an automobile engine having the usual radiator and cooling fan.

Figure 2 shows in cross section elevation the device, taken on plane 2—2 of Figure 5, with parts somewhat distorted so as to show clearly the relation of the various parts. The upper part of this figure corresponds to the section on plane 2—2 of Fig. 5. The lower portion to the section on plane 2'—3' of Fig. 5.

Figure 3 shows in cross sectional elevation taken on plane 3—3 with parts somewhat distorted. So as to show clearly the relation of the various parts to each other the distortion is indicated by arrows on the drawings. The upper part of this figure corresponds to the section on plane 3—3 of Fig. 5. The lower part to the section on the plane 2'—3'' of Fig. 5.

Figure 4 shows a detail, shown in elevation, taken on plane 4—4 of Fig. 3.

Figure 5 shows a sectional plan view taken on plane 5—5 of Figure 2.

In the figures, 1 is the air entrance, 2 is the mixture chamber of Venturi form, 3 is the fuel nozzle discharging therein. An air vented well 4 is provided to which air is admitted through a perforated tube 5, the inside of this tube 5 being in restricted communication with the atmosphere. This well 4 is fed through a restricted opening 6 which is controlled by a needle valve 7 contained in chamber 67 (see Figs. 1 and 2), which is controlled by the thermostat 8, consisting of flexible bellows containing liquid, which liquid communicates thru a pipe 68, with a heat responsive element 9 which is located in water outlet 51 which leads from cylinder 55 to the radiator 50 (see Figure 1).

A low speed passage 10 with outlets 11 and 12 is shown, these outlets being controlled by throttle 13 in a well known manner. This is simply a diagrammatic illustration as the specific low speed passage forms no part of the invention and is merely intended to indicate the normal means for operating an engine after the thermostatic elements have ceased to function.

Continuing with the description of Figure 2, a starting by-pass 14 is provided into which fuel discharges from an outlet 15.

This passage 14 is controlled by valve 16 located on end of shaft 18, which is connected to a piston 19. The piston engages with spring 20 and slides into cylinder 21; this cylinder 21 communicates through an angular opening 22 (through which passes the rod 18 in Fig. 2) with the inlet manifold 23 (see Figure 1).

In order to retain the valve 16 in place so that it may act promptly, a cotter pin 17 is provided, which limits the opening of valve 16.

The fuel nozzle 15 is fed by an air vented well 59 into which dips the tube 58. Fuel flows into this well past the needle valve 37, which is mounted on the flexible diaphragm 36. Valve 37 is provided with a round head 35 which engages with cam 33, which cam 33 is controlled by the action of the thermostat 29, to which it is connected by the levers and links 28, 31 and 32. This cam 33 is mounted on a bracket 34 which projects from the inlet manifold 23. A thermostat 29 is mounted on a bracket 30 projecting from the exhaust manifold 60. This thermostat 29 is also connected by links 28, 31 and 32, with the exhaust control valve 25, which is located in the exhaust manifold 60, an exhaust passage 39 communicating with exhaust outlet 53.

The particular valve and heat control is in itself no part of the invention, as it is copied from Petit Patent #1,818,270 and from the co-pending United States application #398,593, Meinzinger Patent 2,005,869 filed March 14, 1932.

In Figure 3 is shown a passage 41, corresponding to passage 14 of Figure 2. This passage 41 communicates with the air entrance 1 and the mixture outlet through 42 on the engine side of the throttle valve 13. This passage 41 is controlled by 46 which is a projection on the end of the throttle shaft 45.

This projection or extension 44 is provided with a relieved portion so as to form a valve which opens at a faster rate than throttle 13, Fig. 4. This passage 41 is supplied with fuel from a nozzle 43 which is fed from an air vented well 61 into which dips a perforated tube 62, which tube communicates with the atmosphere, through a restricted opening.

The flow of fuel to this is controlled by a needle valve 47, mounted on a flexible diaphragm 49 provided with a round head 48 which rides on the cam 50. This cam 50 forming part of a cam shaft, is mounted on the bracket 34, which extends from the inlet manifold 23. This cam shaft is operated by links 31 and 32, connected with the thermostat 39. Cams 50 and 33 are mounted on the same shaft, Fig. 5.

Operation

When the engine is started the spring 20 acts to lift the valve 16 off its seat and thus opens the passage 14 (Figure 2) so that 14 is in direct communication with the inlet manifold 23 on the engine side of the throttle 13. With the throttle 13 closed a rich mixture is formed in the passage 14, as the air drawn down 14 draws fuel from the outlet 15 supplied by the air vented well 59. If the engine is cold, the thermostat 29 moves cam 33 in the passage which allows maximum fuel to flow by needle valve 37 into well 59. The moment the engine fires, however, a vacuum is built up in the cylinder 21, causing the piston 19 to move up instantly and so close the passage 14 by means of valve 16, so that the nozzle 15 will cease to discharge fuel. The fuel flow out of 15 is therefore only available during the starting of the engine and before the engine actually fires, and then only when the engine is cold enough to permit valve 37 to be open.

In Figure 3 the rich mixture formed in passage 41 is progressively admitted during the initial opening of the throttle valve 13 by reason of the contour of the extension 44 on the end of the throttle shaft 45. The richness of the mixture provided by the nozzle 43 discharging into the passage 41 is controlled by the cam 50 which engages needle valve 47 and this cam 50 is controlled by the thermostat 29. When the engine is in normal running operation and the temperature of the exhaust manifold increases, the needle valve 37, as well as the needle valve 47, closes off the fuel supply to the air vented wells 59 and 61. The fuel supply is then restricted to that which flows through the restricted opening 6 which is controlled by needle valve 7, Fig. 2. Here it is controlled by the flexible metallic bellows 8, which is connected through pipe 68 to heating element 9, which is located in outlet 51 which water outlet leads to radiator 50. This unit functions as a thermostatic mixture control throughout the whole time the engine runs.

It is thus seen that the three thermostatic controls are applied to the engine—first, the needle valve 37 whose function is to prime the engine before it fires; second, valve 47 to control the amount of fuel needed during the warming-up period; and third, elements 8 and 9 controlling the fuel during normal operation of the engine.

Finally, there is a thermostatic control of the amount of heat applied to the inlet manifold, this thermostat being subjected to the draft from the fan, air flowing through the radiator, and also the temperature of the exhaust jacket around the inlet manifold. As stated above, this particular thermostatic control of the mixture temperature is not in itself an invention, but is a combination of co-pending applications, Serial No. 502,134—Litle Patent 1,940,628; Serial No. 598,593—Meinzinger Patent 2,005,869; and Petit Patent 1,818,270.

On the other hand, the control of the priming mixture and the warming up mixture by the temperature of 1. The exhaust manifold,
2. The inlet manifold,
3. The cooling radiator,
4. The air under the hood, by the thermostat 29, so located that it responds to these four temperatures and also to the time factor, is the essential feature of our invention.

What we claim is:

1. In a carburetor for internal combustion engine having the usual mixing chamber, a main fuel nozzle, mixture outlet and throttle valve therein, a thermostatically controlled means for introducing an additional rich mixture into the mixture outlet only during the starting period until the engine fires, similar thermostatic means for controlling the admission of a rich mixture into the mixture outlet after the engine has fired during the initial opening of the throttle but only until such time as the engine shall have warmed up, and additional thermostatic means for controlling the flow through the main fuel nozzle during normal operation of the engine.

2. The combination with a liquid cooled internal combustion engine having the usual radiator, of a cooling fan therefor operated by the engine, an inlet manifold, an exhaust manifold, an exhaust jacket for a portion of said inlet manifold, a thermostatic device located on the outside of the said exhaust jacket and subjected to the draft from said cooling fan, a priming device adapted to supply a supplemental rich mixture direct to said inlet manifold before the engine fires, an enrichening device adapted to supply a supplemental rich mixture direct to said inlet manifold until the thermostatic device reaches a certain temperature, and means interconnecting both said priming and enrichening devices with said thermostatic device.

3. In a carburetor for an internal combustion engine having the usual mixing chamber, a main fuel nozzle, mixture outlet and throttle valve therein, priming means comprising an air passage communicating with the mixture outlet on the engine side of said throttle, a fuel nozzle discharging therein, a valve controlling the outlet from said passage, means for closing said valve by the depression in the mixture outlet, and thermostatic means for controlling the fuel flow to said nozzle.

4. In a carburetor for an internal combustion engine having the usual mixture chamber, a main fuel nozzle, and mixture outlet and throttle valve therein, warming up means comprising an air passage communicating with the mixture outlet on the engine side of said throttle, a fuel nozzle discharging therein, a valve controlling the outlet from said passage, means interconnecting said valve with said throttle, and thermostatic means for controlling the fuel flow to said nozzle.

5. In a carburetor for an internal combustion engine having the usual mixture chamber, a main fuel nozzle, and mixture outlet and throttle valve therein, double priming means comprising two air passages, each communicating with the mixture outlet on the engine side of the throttle, fuel nozzles discharging into said passages, throttle valves in the outlet from each passage, one throttle being interconnecting with the throttle of the main carburetor, and the other throttle being controlled by the depression in the mixture outlet.

6. The combination with a liquid cooled internal combustion engine having the usual radiator, of a cooling fan therefor operated by the engine, an inlet manifold, an exhaust manifold, an exhaust jacket for a portion of said inlet manifold, a thermostatic device located on the outside of the said exhaust jacket and subjected to the draft from said cooling fan, said device controlling the admission of exhaust gases to said jacket, a priming device adapted to supply a supplemental rich mixture direct to said inlet manifold before the engine fires, an enrichening device adapted to supply a supplemental rich mixture direct to said inlet manifold until the thermostatic device reaches a certain temperature, and means interconnecting both said priming and enrichening devices with said thermostatic device.

7. Starting means for an internal combustion engine having an intake manifold, a carburetor, a throttle control therefor, manual means for manipulating the throttle, a mixture by-pass around said throttle having a fuel entrance thereto, comprising means responsive to intake manifold pressure for decreasing the mixture flow through said by-pass around said throttle when the pressure in the inlet manifold falls below a predetermined figure and for permitting an increased flow when the pressure rises, and thermostatic means for controlling the mixture ratio of the starting mixture supply.

GEORGE M. HOLLEY.
CLAUDE S. KEGERREIS.